(12) United States Patent
Bigi et al.

(10) Patent No.: US 11,124,531 B2
(45) Date of Patent: Sep. 21, 2021

(54) PROCESSES FOR PURIFYING LIGANDS

(71) Applicant: Dow Technology Investments LLC, Midland, MI (US)

(72) Inventors: Marinus A. Bigi, Pearland, TX (US); Michael A. Brammer, Freeport, TX (US); Glenn A. Miller, South Charleston, WV (US)

(73) Assignee: Dow Technology Investments LLC, Midland, MI (US)

( * ) Notice: Subject to any disclaimer, the term of this patent is extended or adjusted under 35 U.S.C. 154(b) by 0 days.

(21) Appl. No.: 16/610,958

(22) PCT Filed: Jun. 12, 2018

(86) PCT No.: PCT/US2018/037096
§ 371 (c)(1),
(2) Date: Nov. 5, 2019

(87) PCT Pub. No.: WO2018/236623
PCT Pub. Date: Dec. 27, 2018

(65) Prior Publication Data
US 2020/0102335 A1    Apr. 2, 2020

Related U.S. Application Data

(60) Provisional application No. 62/521,643, filed on Jun. 19, 2017.

(51) Int. Cl.
*C07F 9/6574* (2006.01)
*C07F 9/02* (2006.01)
(52) U.S. Cl.
CPC .......... *C07F 9/65746* (2013.01); *C07F 9/025* (2013.01)
(58) Field of Classification Search
CPC ..................................................... C07F 9/025
See application file for complete search history.

(56) References Cited

U.S. PATENT DOCUMENTS

| 8,796,481 B2 | 8/2014 | Berens et al. |
| 9,650,401 B2 | 5/2017 | Dyballa et al. |
| 2013/0225849 A1 | 8/2013 | Berens et al. |
| 2014/0288322 A1 | 9/2014 | Miller et al. |
| 2017/0240578 A1 | 8/2017 | Phillips et al. |

FOREIGN PATENT DOCUMENTS

| CN | 1986055 A | 6/2007 | |
| WO | WO-2010042313 A1 * | 4/2010 | .......... C07F 9/65746 |
| WO | 2013/066712 | 5/2013 | |
| WO | WO-2015175158 A1 * | 11/2015 | ........... C07D 233/56 |
| WO | 2016/205264 | 12/2016 | |
| WO | 2017/058475 | 4/2017 | |

OTHER PUBLICATIONS

Hao, Chinese Journal of Structural Chemistry, 2012, vol. 31, No. 5, p. 673-676.
PCT/US2018/037096, International Search Report and Written Opinion dated Aug. 20, 2018.
PCT/US2018/037096, International Preliminary Report on Patentability dated Jan. 2, 2020.

* cited by examiner

*Primary Examiner* — Joseph R Kosack

(57) ABSTRACT

Embodiments of the present invention are directed to processes for purifying ligands such as organopolyphosphite ligands. In one embodiment, a process comprises: (a) receiving a solid organopolyphosphite compound that has been recrystallized or triturated at least once, wherein the solid organopolyphosphite compound comprises greater than one weight percent of an oxidized phosphite impurity and wherein the organopolyphosphite compound is substantially free of solvent; (b) slurrying the solid organopolyphosphite compound in a $C_2$ or higher alcohol at a temperature of at least 60° C. for at least 20 minutes to reduce the oxidized phosphite impurity in the solid phase; and (c) removing liquid comprising dissolved oxidized phosphite impurity from the slurry, wherein the residual oxidized phosphite impurity content of the organopolyphosphite compound following step (c) is 1 weight percent or less.

15 Claims, No Drawings

PROCESSES FOR PURIFYING LIGANDS

FIELD

The present invention relates to processes for purifying ligands and to purified forms of ligands such as organopolyphosphite ligands.

BACKGROUND

Organopolyphosphites such as bisphosphites are commonly used as ligands for transition-metal catalyzed reactions such as hydroformylation and hydrocyanation. Commonly cited bisphosphite ligands include 6,6'-[[3,3',5,5'-tetrakis(1,1-dimethylethyl)-[1,1'-biphenyl]-2,2'-diyl]bis(oxy)]bisdibenzo[d,f][1,3,2]-dioxaphosphepin, (hereinafter Ligand A), and 6,6'-[[(3,3'-di(1,1-dimethylethyl)-5,5'-dimethoxy-1,1'-biphenyl)-2,2'-diyl)bis(oxy)]bisdibenzo[d,f][1,3,2]-dioxaphosphepin (hereinafter Ligand B) shown in Formula I:

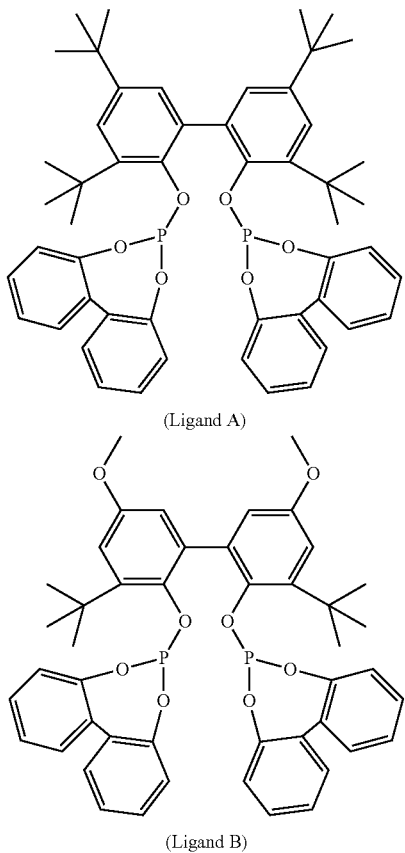

Like many organic molecules, Ligand A is a crystalline material capable of existing in a number of forms. A crystalline non-solvate and various solvate forms are disclosed in U.S. Pat. No. 8,796,481 and Yuan Hao, et al. "Crystal Structure of 6,6'-(3,3'5,5'-tetra-tertbutylbiphenyl-2,2'-diyl)Bis(oxy)didibenzo[d,f]-[1,3,2]dioxaphosphepine" *Chinese J. Struct. Chem.*, Vol 31, 673 (2012). Ligand B is commercially available, usually as the ethyl acetate hemisolvate.

US Patent Publication No. 2014/0288322 discloses a process for preparing a fast drying form of Ligand A via treatment with a secondary alcohol, e.g., isopropanol, at 72-75° C. for several hours. The crystal structure of the resulting material is not disclosed. U.S. Pat. No. 8,796,481 describes a means to make the non-solvate form of Ligand A as well as a number of solvates. Preparation of the crystalline non-solvate thus described also requires elevated temperatures, e.g., at least 65° C. and preferably above 85° C. While both forms of Ligand A described in US Patent Publication No. 2014/0288322 and U.S. Pat. No. 8,796,481 are suitable for hydroformylation applications, elevated temperatures are required to produce them. Exposing bisphosphites to elevated temperatures, particularly in the presence of impurities, may increase decomposition and thereby lower the yield of the valuable product.

US Patent Publication No. 2013/0225849 discloses purification of bisphosphites by dissolution followed by treatment with an anti-solvent such as methanol to induce crystallization to generate specific crystal morphologies. Similarly, WO2015121007 discloses purification of bisphosphites by dissolution followed by treatment with an anti-solvent to induce crystallization.

Another alternative to purification is to prepare and use a desolvated form, but effectively drying solvated materials is known to take days under forcing conditions. (See, e.g., US Patent Publication No. 2014/0288322). Such procedures can also result in decomposition (e.g., oxidation due to extended handling), and will increase the production time and, therefore, the cost of manufacture.

Oxidation of phosphites either during production or upon storage prior to use is a problem in that the resulting compound is a monodentate phosphite thus does not perform as desired when used in hydroformylation. In addition, the oxidized species will contribute to hydrolysis and acid forming side reactions, thus enhancing further ligand decomposition and shortening catalyst life. Since the molecular weights of bisphosphite ligands such as Ligand A are extremely large, the presence of an oxygen atom would not be expected to dramatically change the crystallization behavior of the ligand. Indeed, until now, it has been found that simple recrystallization techniques have been ineffective in removing the oxidized impurities without unacceptable losses.

Thus, it would be desirable to have a process to purify or reprocess degraded organopolyphosphites (e.g., bisphosphites such as Ligand A) to generate a form that is thermally stable, and that can be prepared via a facile, cost-effective process that avoids prolonged exposure to elevated temperatures.

SUMMARY

Embodiments of the present invention advantageously provide processes for purifying organopolyphosphite ligands to reduce the amount of oxidized impurities in a manner that, in some aspects, are cost-effective and avoid extended exposure to elevated temperatures.

In one aspect, a process of the present invention comprises: (a) receiving a solid organopolyphosphite compound that has been recrystallized or triturated at least once, wherein the solid organopolyphosphite compound comprises greater than one weight percent of an oxidized phosphite impurity and wherein the organopolyphosphite compound is substantially free of solvent; (b) slurrying the solid organopolyphosphite compound in a $C_2$ or higher alcohol at a temperature of at least 60° C. for at least 20 minutes to reduce the oxidized phosphite impurity in the solid phase; and (c) removing liquid comprising dissolved oxidized phosphite impurity from the slurry, wherein the residual oxidized phosphite impurity content of the organopolyphosphite compound following step (c) is 1 weight percent or less.

These and other embodiments are described in more detail in the Detailed Description.

DETAILED DESCRIPTION

Some embodiments of the present invention are directed to processes for purifying organopolyphosphites (e.g., bisphosphites such as Ligand A and Ligand B). Such processes are performed on a starting material comprising an impure form of organopolyphosphite. In some embodiments, the impure form of organopolyphosphite is a solid organopolyphosphite compound comprising greater than one weight percent of an oxidized phosphite impurity and wherein the organopolyphosphite compound is substantially free of solvent.

As used herein, the terms "solvate," "crystalline solvate," and "solvate form" are used interchangeably, and refer to arrangements of molecules of organopolyphosphites that include solvent molecules incorporated within the crystal lattice, i.e., solvents of crystallization, such as described, for example, in "Solid State Physics" (2nd Edition), J. R. Hook, H. E. Hall, Manchester Physics Series, John Wiley & Sons (2010). Mentioning the specific solvent incorporated within the lattice is done for clarity in some instances (e.g., toluene solvate, ethyl acetate solvate, propyl acetate solvate, hexane solvate, acetone solvate, etc.).

As used herein, the terms "desolvated form," and "desolvated isomorph" are used interchangeably and mean crystalline organopolyphosphite that was originally in a solvate form, but wherein the solvent of crystallization has been removed.

As used herein, the term "substantially free of solvent" is contemplated to comprise organopolyphosphite that does not contain solvent beyond that found incorporated within the solvate form (i.e., solvent of crystallization). For example, an otherwise dry composition which still contains traces of solvent incorporated within the crystal lattice is substantially free of solvent, whereas a slurry or wet cake is not substantially free of solvent.

As used herein, the term "recrystallization" means the complete dissolution of organopolyphosphite solids followed by the formation of new organopolyphosphite crystals. The crystal forms of the starting material and recrystallized material may be the same or different.

As used herein, the term "trituration" means that solids are thoroughly mixed in a solvent to form a slurry. It is noted that, although a small portion of the solids may dissolve, trituration does not include the complete dissolution of the crude bisphosphite, such as would occur during a recrystallization.

As used herein, the term "ppmw" means parts per million by weight.

As used herein, the term "solvent of crystallization" means solvent that is incorporated within the crystal structure.

As used herein, the term "substituted" is contemplated to include all permissible substituents of organic compounds unless otherwise indicated. In a broad aspect, the permissible substituents on organopolyphosphites include acyclic and cyclic, branched and unbranched, carbocyclic and heterocyclic, aromatic and nonaromatic substituents of organic compounds. Illustrative substituents include, for example, alkyl, alkyloxy, aryl, aryloxy, hydroxyalkyl, aminoalkyl, in which the number of carbons can range from 1 to 20 or more, preferably from 1 to 12, as well as hydroxy, halo, and amino. The permissible substituents can be one or more and the same or different for appropriate organic compounds. This invention is not intended to be limited in any manner by the permissible substituents of organic compounds.

As used herein, the term "hydroformylation" is contemplated to include, but is not limited to, all hydroformylation processes that involve converting one or more substituted or unsubstituted olefinic compounds or a reaction mixture comprising one or more substituted or unsubstituted olefinic compounds to one or more substituted or unsubstituted aldehydes or a reaction mixture comprising one or more substituted or unsubstituted aldehydes. The aldehydes may be asymmetric or non-asymmetric.

In one embodiment, a process of the present invention comprises (a) receiving a solid organopolyphosphite compound that has been recrystallized or triturated at least once, wherein the solid organopolyphosphite compound comprises greater than 1 weight percent of an oxidized phosphite impurity and wherein the organopolyphosphite compound is substantially free of solvent; (b) slurrying the solid organopolyphosphite compound in a $C_2$ or higher alcohol at a temperature of at least 60° C. for at least 20 minutes to reduce the oxidized phosphite impurity in the solid phase; and (c) removing liquid comprising dissolved oxidized phosphite impurity from the slurry, wherein the residual oxidized phosphite impurity content of the organopolyphosphite compound following step (c) is 1 weight percent or less. In some embodiments, the organopolyphosphite is an organobisphosphite.

In some embodiments, the dissolved oxidized phosphite impurity is removed by filtration. The dissolved oxidized phosphite impurity is removed by centrifugation in some embodiments.

In some embodiments, the solid organopolyphosphite compound is slurried in $C_2$ or higher alcohol in step (b) at a temperature of at least 65° C. for at least 30 minutes.

In some embodiments, steps (b) and (c) are repeated one or more times.

The solid organopolyphosphite compound that is received in step (a) is stored for at least 30 days prior to step (a) in some embodiments. In other words, after recrystallization or trituration, the solid organopolyphosphite compound is stored for at least 30 days prior to undergoing the process. This illustrates how, in some embodiments, processes of the present invention can be used to remove impurities from ligand that has been stored for an extended period of time and that may not be well suited for hydroformylation reactions due to the impurities.

In some embodiments, the process comprises dissolving the solid organopolyphosphite in aromatic hydrocarbon solvent prior to step (a), filtering the resulting solution, and then concentrating the resulting filtrate. The term "aromatic hydrocarbon" is contemplated to include all permissible compounds comprised of carbon and hydrogen atoms, and containing at least one benzene moiety. Such benzene moieties may be substituted or unsubstituted. As used herein, the term "aromatic hydrocarbon" does not include nitrogen, sulfur, and oxygen moieties. Examples of aromatic hydrocarbons include toluene, xylenes, and the like. Suitable compounds will have a dielectric constant at or below 5 $\varepsilon_r(\omega)$ (at 20° C.). Such processes are described in more detail in PCT Publication No. WO 2017/058475, which is hereby incorporated by reference. In some embodiments, the aromatic hydrocarbon solvent is toluene.

In some embodiments, a process further comprises, after step (c), (d) dissolving the solid organopolyphosphite in a solvent to provide an organopolyphosphite solution; (e) optionally filtering then concentrating the organopolyphosphite solution; (f) combining the organophosphite solution with an anti-solvent; and (g) collecting the resulting solids.

In some embodiments, a process further comprises, after step (c), (d) dissolving the solid organopolyphosphite in a solvent at a temperature of at least 60° C. to provide an organopolyphosphite solution; (e) optionally filtering then concentrating the organopolyphosphite solution; (f) cooling the organopolyphosphite solution; and (g) collecting the resulting solids.

In some embodiments, 0.05 to 13 acid-neutralizing equivalents per 100 moles organopolyphosphite of an acid-scavenger is added at or after step (c). Suitable acid scavengers are described in PCT Publication No. WO 2015/175158A1, which is hereby incorporated by reference. Particularly suitable acid scavengers include ethoxylated tertiary amines, methyldiethoxy amine, dimethylethoxy amine, ethyldiethoxyamine, tri-3-propoxyamine, tri-(2-(methanol)ethyl)amine, tri-isopropanolamine and their propoxylates, 4-hydroxy-2,2,6,6-tetramethylpiperidine, bis (2,2,6,6-tetramethyl-4-piperidyl) sebacate, imidazole, benzimidazole, benzotriazole, trisodium phosphate, disodium maleate, and triethanolamine (TEA). In some embodiments, the acid scavenger is triethanolamine.

In some embodiments, the organopolyphosphite compound resulting from the inventive process is provided to a hydroformylation process.

Organopolyphosphites that can be processed in embodiments of the present invention include bisphosphites, such as Ligand A and Ligand B.

Solvates of Ligand A are known, and can be prepared as described, for example, in US Patent Publication No. 2014/0288322 and U.S. Pat. No. 8,796,481. Specific examples of solvates of Ligand A include the toluene solvate, the acetone solvate, the acetonitrile solvate, the hexane solvate, the ethyl acetate solvate, and the propyl acetate solvate, as well as the desolvated materials prepared therefrom. Specific examples of solvates of Ligand B include the ethyl acetate hemisolvate, as well as the desolvated isomorphs prepared therefrom. Acetate-ester solvates and non-solvates are the preferred starting material for some embodiments of the present invention. Mixtures of solvates and non-solvates can also be employed in some embodiments.

It has been found that prior art processes are ineffective in removing oxidation degradation products wherein one of the phosphite moieties has been oxidized to a phosphate moiety. This can occur during production but also during storage of the solid product in drums if air ingress has occurred. Conventional recrystallization or trituration processes are generally used to remove impurities such as phosphorous acid and hydrolysis degradation products generated during the initial ligand production and prior to implementation of processes of the present invention. The amount of degradation occurring during storage is a function of a number of factors such as initial purity (e.g., presence of free solvent or moisture), crystal morphology, amount of air and/or moisture ingress, storage temperature, and the like. Packaged product may, for example, have been purified prior to packaging and storage via recrystallization or trituration, but then subsequently degraded into byproducts including the oxide. Processes of the present invention are implemented at some point after any recrystallization or trituration that occurred during initial production of the ligand. In some embodiments, processes of the present invention are implemented at least 30 days after initial production of the ligand (e.g., after the ligand has been stored for at least 30 days).

Processes according to the present invention comprise receiving a solid organopolyphosphite compound that has been recrystallized or triturated at least once. The solid organopolyphosphite compound comprises greater than 1 weight percent of an oxidized phosphite impurity. Oxidized phosphite impurity levels can be measured using conventional techniques such as $^{31}P$ NMR or high pressure liquid chromatography (HPLC). In addition, the organopolyphosphite compound is substantially free of solvent.

The solid organopolyphosphite compound is then slurried in a $C_2$ or higher alcohol at a temperature of at least 60° C. for at least 20 minutes to reduce the oxidized phosphite impurity in the solid phase. In some embodiments, the solid organopolyphosphite compound is slurried in a $C_2$-$C_{25}$ alcohol at a temperature of at least 60° C. for at least 20 minutes. In some embodiments, the solid organopolyphosphite compound is slurried in a $C_3$-$C_6$ alcohol at a temperature of at least 60° C. for at least 20 minutes.

As used herein, the term "$C_2$ or higher alcohol" means alcohols with at least two carbon atoms. For example, ethanol, isopropanol, and tertiary butanol are $C_2$ or higher alcohols, while methanol is not a $C_2$ or higher alcohol. Alcohols that can be employed in the process of the invention are shown in Formulas II and III:

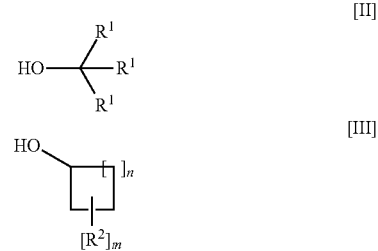

Noncyclic saturated, alcohols are represented by Formula II, wherein each of $R^1$ are independently a hydrogen or a substituted or unsubstituted monovalent hydrocarbon moiety containing from 1 to 8 carbon atoms, with the proviso that at least one $R^1$ is not hydrogen. Cyclic alcohols, such as cyclohexanol and its analogs, are represented by Formula III, wherein n is 2 to 5, m is from 0 to [(2n)+5], and each $R^2$ is independently a substituted or unsubstituted monovalent hydrocarbon moiety. In one embodiment of the invention, each $R^1$ or $R^2$ is unsubstituted. In one embodiment of the invention, m in Formula III is 0 to 3. Mixtures of alcohols can be employed in some embodiments. The alcohol can be a tertiary or secondary alcohol in some embodiments. Secondary alcohols are particularly useful in some embodiments.

$C_3$-$C_6$ secondary alcohols, such as isopropanol, cyclohexanol, 2-butanol, 2- or 3-pentanol, and the like, are particularly suitable in some embodiments. Ethanol is a particularly suitable primary alcohol. t-Butanol is a particularly suitable tertiary alcohol. Isopropanol is a particularly suitable non-linear alcohol in some embodiments, as it is readily separated from the final purified organopolyphosphite (e.g., bisphosphite) product. In one embodiment, the alcohol used is substantially peroxide-free to avoid oxidation of the ligand. As used herein, the term "substantially peroxide-free" means that the alcohol contains less than 10 ppmw peroxides.

Small amounts of amine additives, as taught in PCT Publication No. WO 2015/175158A1, may also be employed to mitigate excessive acid-catalyzed decomposition. A preferred amine is triethanolamine. In various embodiments of the invention, the amine is added to the slurry and/or to the alcohol. In various embodiments, the amine concentration is less than 1 wt. %, less than 0.1 wt %, or less than 0.01 wt %, based on the weight of the slurry.

In some embodiments, it is important to avoid introducing additional oxidation during the processing. Thus, in some embodiments, small amounts of oxygen scavengers can be added to the organopolyphosphite prior to processing and/or to the solvents. Small amounts of alkyl or arylphosphines are particularly suitable oxygen scavengers. Examples of suitable oxygen scavengers are given in CN1986055B with preference given to triphenylphosphine, tri(alkylatedphenyl)phosphine, cyclohexyldiphenylphosphine, and dicyclohexylphenylphosphine. In some embodiments, the oxygen scavengers are soluble in the trituation solvent or any subsequent solvent used such that no detectable amounts of the oxygen scavengers remain in the final product.

The slurrying step is conducted under conditions sufficient to purify the organopolyphosphite (e.g., bisphosphite). In one embodiment, a solvate of an organopolyphosphite (such as Ligand A or Ligand B) is triturated in the secondary or tertiary alcohol under conditions detailed below. The resulting slurry is then separated into a primarily solid phase and a primarily liquid phase. The primarily solid phase may be dried to obtain dry organopolyphosphite ligand.

The trituration of organopolyphosphite ligands such as Ligand A employ the alcohol and the non-solvate, desolvated or solvate form of the organopolyphosphite ligand in amounts that may be mixed effectively. A large volume of secondary or tertiary alcohol may be employed, as the ligand does not dissolve to an appreciable extent, but the alcohol advantageously is employed in an amount that is sufficient to generate an easily mixed slurry. The resulting slurry should be capable of being easily stirred and should provide good heat transfer, as evidenced by having a uniform temperature, and good handling (e.g., the slurry advantageously can be easily transferred to other equipment such as a filter, if desired).

Methods for preparing slurries are well known to those skilled in the art, and the slurry can be prepared by any convenient method. The slurry can be prepared using any suitable equipment including, for example, stirred vessels such as stirred tanks or reactors, stirred filters/dryers, recirculating static mixer tanks, and the like. The type of vessel is not particularly critical. In one embodiment of the invention, the equipment is capable of operating under an inert gas, e.g., $N_2$ or Ar, atmosphere in order to prevent ligand oxidation and to minimize flammability hazards. The equipment may include means to enable monitoring and controlling the temperature of the slurry in some embodiments.

Once formed, the slurry is heated at a combination of time and temperature (at or above 60° C.) sufficient to produce the purified form of the organopolyphosphite ligand. For instance, suitable combinations of time and temperature are given in the Examples below. In some embodiments, the slurry is heated above 60° C. for at least 20 minutes. The slurry is heated above 65° C. for at least 30 minutes in some embodiments. In some embodiments, good stirring of the slurry is maintained during the time and temperature treatment. For the purposes of this invention, "oxidized phosphite impurities" refer to the mono- and di-oxide forms of an organopolyphosphite ligand (e.g., a bisphosphite such as Ligand A) wherein one or both of the phosphorous atom(s) has been oxidized to a phosphate moiety. The temperature and duration of the treatment may determine whether a solvated crystal morph or a non-solvated crystal morph is obtained (see, e.g., PCT Patent Publication No. WO 2016/205264), both of which are suitable for use for hydroformylation catalysis.

The resulting purified organopolyphosphite ligand formed in the process is recovered. In one embodiment of the invention, the liquid comprising dissolved oxidized phosphite impurity is removed from the solids comprising the organopolyphosphite wherein a substantial portion of the oxidized phosphite impurities are in the liquid layer. In some embodiments, the residual oxidized phosphite impurity content of the organopolyphosphite compound following removal of the liquid with the dissolved oxidized phosphite impurity is 1 weight percent or less. The residual oxidized phosphite impurity content of the organopolyphosphite compound following removal of the liquid with the dissolved oxidized phosphite impurity is 0.8 weight percent or less in some embodiments.

The manner of separating the organopolyphosphite solids from the bulk of the liquid of the slurry is not particularly critical. Unit operations for separating solids from liquids are well known to those skilled in the art and include, for example, filtration, sedimentation, spray drying, fluidized bed drying, centrifugation, such as in a hydrocyclone or centrifuge, and combinations thereof. Equipment for use in conducting said unit operations are also well known, and many suitable types are commercially available.

In one embodiment, the recovery equipment is capable of separation of solids from liquids, preferably by filtration or centrifugation. In one embodiment of the invention, the recovered solids are a damp form of the organopolyphosphite ligand that primarily comprises the ligand with some residual liquid from the slurry. The filter cake may optionally be washed or rinsed. Such washing is advantageously done with the same alcohol employed for the trituration.

The temperature at which the solid organopolyphosphite is recovered is not critical and may be performed at a temperature or range of temperatures that includes ambient temperature. In one embodiment, the separation is performed at a temperature or range of temperatures that is above ambient temperature. The slurry preparation and the liquid/solid separation operations can be done in separate units, or in equipment suitable for conducting preparation, heat treatment, and separation in one piece of equipment.

In one embodiment of the invention, the damp organopolyphosphite is dried prior to use or storage. Unit operations for drying solids are well known to those skilled in the art. Equipment for use in drying solids is also well known, and many suitable types are commercially available, including for example, belt dryers, drum dryers, filter dryers and the like, with heating provided by convection, conduction, and radiation including, for example, infrared, microwave and radio frequency radiation, and combinations thereof. Multistage drying processes, such as flash drying followed by an agitated paddle dryer, may be employed.

The dried organopolyphosphite can then be provided to a hydroformylation process for use as a ligand with a catalyst metal in a hydroformylation reaction using techniques known to those of skill in the art.

In some embodiments, the organopolyphosphite ligand is further processed prior to providing it to a hydroformylation process. In some embodiments, the solid organopolyphosphite after step (c) is dissolved in a solvent to provide an organopolyphosphite solution, the organopolyphosphite solution is combined with an anti-solvent, and the resulting solids are collected. In some embodiments, the organopolyphosphite solution is filtered and then concentrated prior to combining with the anti-solvent. Non-limiting examples of solvents that can be used in step (d) to dissolve the solid organopolyphosphite include aromatic hydrocarbon such as alkylated benzenes (e.g., toluene and xylene), alkylphenyl ethers, halocarbons such as methylene chloride and chlorobenzene, esters such as ethyl or propyl acetate, acetonitrile, and hydrocarbons such as hexane, heptane, octane and mixtures thereof. Non-limiting examples of anti-solvents that can be used in step (f) include isopropanol and t-butanol. In some embodiments, the anti-solvent is ethanol, isopropanol, or t-butanol.

In other embodiments, the organopolyphosphite ligand is further processed prior to use in a hydroformylation process by dissolving the solid organopolyphosphite in a solvent at a temperature of at least 60° C. to provide an organopolyphosphite solution, cooling the organopolyphosphite solution, and collecting the resulting solids. In some embodiments, the organopolyphosphite solution is filtered and then concentrated prior to being cooled. Non-limiting examples of solvents that can be used in step (d) to dissolve the solid organopolyphosphite include alkylated benzenes (e.g., toluene and xylene), alkylphenyl ethers, halocarbons such as chlorobenzene, esters, and acetonitrile.

Some embodiments of the invention will now be described in more detail in the following Examples.

EXAMPLES

All parts and percentages in the following examples are by weight unless otherwise indicated.

The total oxide content of solid organopolyphosphite is determined by high pressure liquid chromatography (HPLC) using an Agilent 1260 Quaternary LC equipped with a Diode-Array Detector. The HPLC is fitted with a Supelco Supelcosil LC-18, 25 cm×4.6 mm (L×I.D.), 5 micron particle size analytical column. Water/methanol mixtures are used as the eluent at a flow rate of 1.0 mL/min Samples are prepared by dissolving the solid organopolyphosphite (0.1 g) in toluene (10.0 g), filtering the resulting solution (1.0 g) through a sub-micron syringe filter, and diluting the resulting filtrate with a 0.2 wt % cyclohexyldiphenylphosphine in tetraglyme solution (2.0 g). Oxide concentration is calculated using a calibration curve based on compound response factors and reported as wt %.

Comparative Experiment A

Solid Ligand A (1.0 g) containing 1.45 wt % total oxides is placed on a Buchner funnel and washed five times (5×) with 4 mL hot isopropanol (heated to 70° C.), using vacuum filtration to dry the solid after each wash. The solids are collected and analyzed by HPLC to measure total oxide content. The results are summarized in Table 1.

TABLE 1

Isopropanol wash of Ligand A.

| Comparative Experiment | Solvent | Procedure | Initial Total Oxides (wt %) | Post-wash Total Oxides (wt %) |
|---|---|---|---|---|
| A | Isopropanol | Solid washed 5 X with hot isopropanol | 1.45 | 1.61 |

Comparative Experiment A shows that simply washing solid Ligand A with hot isopropanol does not reduce the total oxide content.

Example 1

Solid Ligand A (1.0 g) containing 1.36 wt % total oxides is treated with 10 mL isopropanol and the resulting suspension is heated to 70° C. and stirred for 30 minutes. The solids are collected by vacuum filtration and washed one time (1×) with isopropanol (5 mL). The results are summarized in Table 2.

Example 2

Solid Ligand A (0.5 g) containing 1.45 wt % total oxides is treated with 10 mL tert-butanol and the resulting suspension is heated to 70° C. and stirred for 30 minutes. The solids are collected by vacuum filtration. The results are summarized in Table 2.

Example 3

Solid Ligand A (0.5 g) containing 1.45 wt % total oxides is treated with 10 mL ethanol and the resulting suspension is stirred at 70° C. for 30 minutes. The solids are collected by vacuum filtration. The results are summarized in Table 2.

Example 4

Solid Ligand A (1.0 g) containing 1.45 wt % total oxides is dissolved in 10 g toluene, filtered through a 0.20 micron syringe filter, and the resulting filtrate is concentrated under a stream of nitrogen at 70° C. until a slurry remained. To the resulting slurry is added 10 g isopropanol and the resulting suspension continued stirring at 70° C. for 30 minutes. The solids are collected by vacuum filtration and washed one time (1×) with isopropanol (5 mL). The results are summarized in Table 2.

Example 5

Solid Ligand A (0.5 g) containing 1.45 wt % total oxides is dissolved in 2.0 mL toluene at 70° C. Next, isopropanol is added (10 mL) and the resulting slurry stirred at 70° C. for 30 minutes. The mixture cooled to ambient temperature and the supernatant is removed using a long syringe while under a nitrogen pad. The solids are collected and analyzed by HPLC. The results are summarized in Table 2.

Example 6a-6b

Solid Ligand A (0.5 g) containing 1.65 wt % total oxides and cyclohexyldiphenylphosphine (0.005 g) are treated with 1.0 mL toluene at 70° C. Next, isopropanol (10 mL) is added and the resulting suspension is stirred at 70° C. for 20 minutes. The mixture cooled to ambient temperature and the supernatant is removed using a long syringe while under a nitrogen pad. The solids are collected and analyzed by HPLC. The results are summarized as Example 6a in Table 2.

Next, the isolated solids are treated with isopropanol (10 mL) and the resulting suspension is again stirred at 70° C. for 20 minutes. The mixture cooled to ambient temperature and the supernatant is removed using a long syringe while under a nitrogen pad. The solids are collected and analyzed by HPLC. The results are summarized as Example 6b in Table 2.

TABLE 2

Trituration Treatments of Ligand A to Reduce Total Oxide Content.

| Example | Solvent | Procedure | Initial Total Oxides (wt %) | Post-wash Total Oxides (wt %) |
|---|---|---|---|---|
| 1 | Isopropanol | Trituration at 70° C., 30 min | 1.36 | 0.65 |
| 2 | tert-Butanol | Trituration at 70° C., 30 min | 1.45 | 0.85 |
| 3 | Ethanol | Trituration at 70° C., 30 min | 1.36 | 0.74 |
| 4 | Toluene/ Isopropanol | Toluene Dissolution/ Toluene Removal/ Isopropanol Trituration at 70° C. | 1.45 | 0.95 |
| 5 | Toluene/ Isopropanol | Toluene Dissolution/ Isopropanol Trituration at 70° C. | 1.45 | 0.52 |
| 6a | Toluene/ Isopropanol | Toluene Dissolution including Oxygen Scavenger/Isopropanol Trituration at 70° C. | 1.65 | 0.64 |
| 6b | Isopropanol | Additional Isopropanol trituration on material isolated from Ex 6a | | 0.54 |

What is claimed is:

1. A process comprising:
   (a) receiving a solid organopolyphosphite compound that has been recrystallized or triturated at least once, wherein the solid organopolyphosphite compound comprises greater than one weight percent of an oxidized phosphite impurity and wherein the organopolyphosphite compound is substantially free of solvent;
   (b) slurrying the solid organopolyphosphite compound in a $C_2$ or higher alcohol at a temperature of at least 60° C. for at least 20 minutes to reduce the oxidized phosphite impurity in the solid phase; and
   (c) removing liquid comprising dissolved oxidized phosphite impurity from the slurry, wherein the residual oxidized phosphite impurity content of the organopolyphosphite compound following step (c) is 1 weight percent or less.

2. The process of claim 1, wherein the organopolyphosphite is an organobisphosphite.

3. The process of claim 1, wherein the dissolved oxidized phosphite impurity is removed by filtration.

4. The process of claim 1, wherein the dissolved oxidized phosphite impurity is removed by centrifugation.

5. The process of claim 1, wherein the step (b) comprises heating the slurry above 65° C. for at least 30 minutes.

6. The process of claim 1, further comprising repeating steps (b) and (c) one or more times.

7. The process of claim 1, storing the solid organopolyphosphite compound for at least 30 days prior to step (a).

8. The process of claim 1, further comprising (d) dissolving the solid organopolyphosphite in a solvent to provide an organopolyphosphite solution; (e) optionally filtering then concentrating the organopolyphosphite solution; (f) combining the organophosphite solution with an anti-solvent; and (g) collecting the resulting solids.

9. The process of claim 8, wherein the anti-solvent is ethanol, isopropanol or t-butanol.

10. The process of claim 1, further comprising (d) dissolving the solid organopolyphosphite in a solvent at a temperature of at least 60° C. to provide an organopolyphosphite solution; (e) optionally filtering then concentrating the organopolyphosphite solution; (f) cooling the organopolyphosphite solution; and (g) collecting the resulting solids.

11. The process of claim 1, wherein from 0.05 to 13 acid-neutralizing equivalents per 100 moles organopolyphosphite of an acid-scavenger is added at or after step (c).

12. The process of claim 11, wherein the acid-scavenger is ethoxylated tertiary amines, methyldiethoxy amine, dimethylethoxy amine, ethyldiethoxyamine, tri-3-propoxyamine, tri-(2-(methanol)ethyl)amine, tri-isopropanolamine and their propoxylates, 4-hydroxy-2, 2, 6, 6-tetramethylpiperidine, bis(2, 2, 6, 6-tetramethyl-4-piperidyl) sebacate, imidazole, benzimidazole, benzotriazole, trisodium phosphate, disodium maleate, or triethanolamine (TEA).

13. The process of claim 1, further comprising providing the organopolyphosphite from step (c) to a hydroformylation process.

14. The process of claim 1 wherein the $C_2$ or higher alcohol comprises a secondary or tertiary alcohol.

15. The process of claim 1, further comprising dissolving the solid organopolyphosphite in aromatic hydrocarbon solvent prior to step (a), filtering the resulting solution, and then concentrating the resulting filtrate.

* * * * *